United States Patent [19]

Shimada et al.

[11] Patent Number: 4,919,098
[45] Date of Patent: Apr. 24, 1990

[54] APPARATUS AND METHOD OF ELECTRONICALLY CONTROLLING ENGINE

[75] Inventors: Kousaku Shimada, Katsuta; Teruji Sekozawa, Kawasaki; Motohisa Funabashi, Sagamihara, all of Japan

[73] Assignee: Hitachi, Ltd., Tokyo, Japan

[21] Appl. No.: 266,075

[22] Filed: Nov. 2, 1988

[30] Foreign Application Priority Data

Nov. 5, 1987 [JP] Japan ................................ 62-279874

[51] Int. Cl.⁵ .......................... F22D 1/40; F22B 37/36
[52] U.S. Cl. .................................. 123/422; 123/494; 123/418; 123/419
[58] Field of Search ............... 123/422, 425, 419, 418, 123/436, 494, 414; 364/431.08

[56] References Cited

U.S. PATENT DOCUMENTS

| | | | |
|---|---|---|---|
| 4,457,283 | 7/1984 | Kobayashi et al. | 123/494 |
| 4,487,186 | 12/1984 | Wahl et al. | 123/419 |
| 4,508,086 | 4/1985 | Ito et al. | 123/494 |
| 4,513,716 | 4/1985 | Haraguchi et al. | 123/425 |
| 4,570,594 | 2/1986 | Egami et al. | 123/422 |
| 4,776,312 | 10/1988 | Yoshioka et al. | 123/436 |
| 4,799,469 | 1/1989 | Nagano et al. | 123/418 |
| 4,803,967 | 2/1989 | Ohkumo | 123/422 |
| 4,819,171 | 4/1989 | Morita | 364/431.08 |
| 4,843,555 | 6/1989 | Hattori et al. | 123/494 |

FOREIGN PATENT DOCUMENTS

| | | | |
|---|---|---|---|
| 59-93945 | 5/1984 | Japan | 123/422 |
| 59-231144 | 12/1984 | Japan | 123/422 |
| 60-30446 | 2/1985 | Japan | 123/422 |

Primary Examiner—Raymond A. Nelli
Attorney, Agent, or Firm—Fay, Sharpe, Beall, Fagan, Minnich & McKee

[57] ABSTRACT

An electronic engine control method and apparatus, which detects acceleration of a vehicle in the travelling directions, derives its differential or displacement difference, i.e., derivative of acceleration, thereby detects the longitudinal oscillation state of the vehicle in acceleration or deceleration and controls the output torque pattern of the engine so as to cause its phase to be opposite to the phase of the pattern of the derivative of acceleration derived.

21 Claims, 10 Drawing Sheets

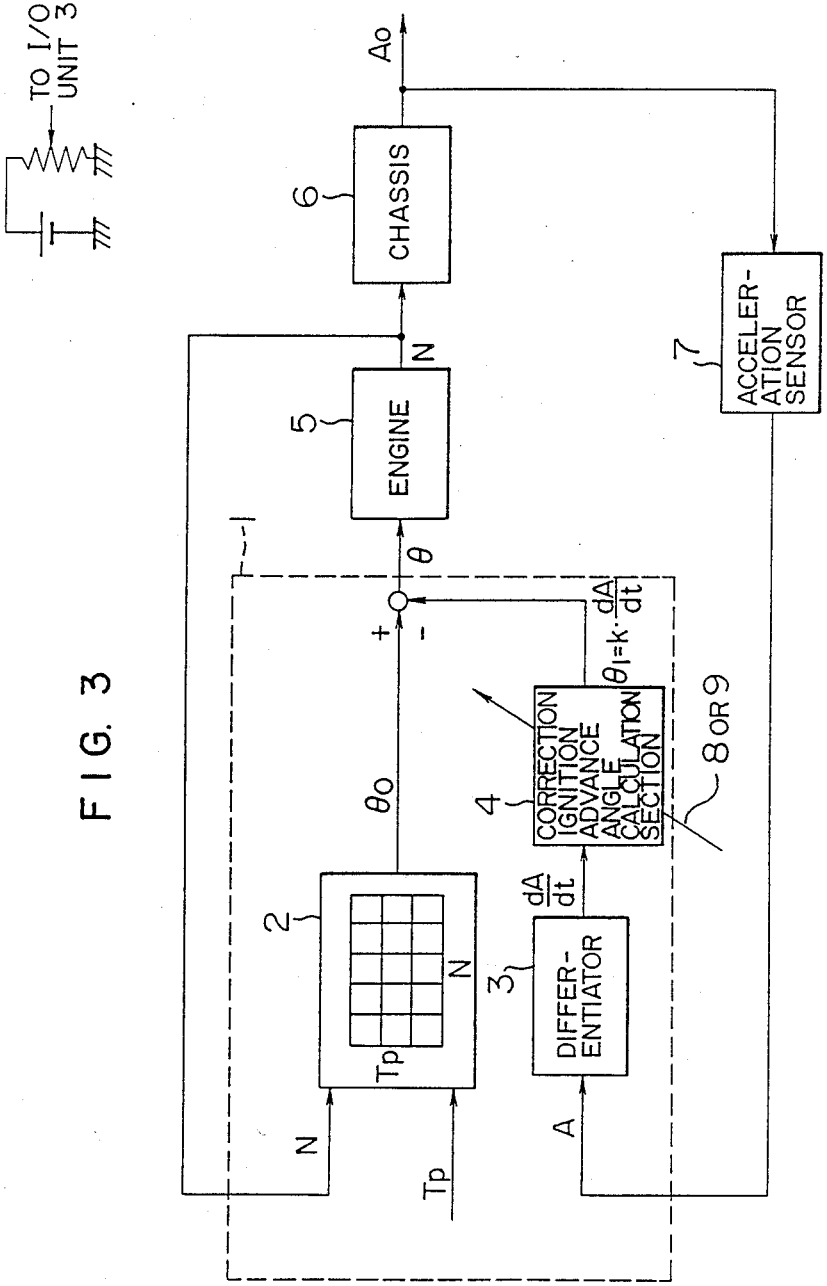

FIG. 6A  k = 0
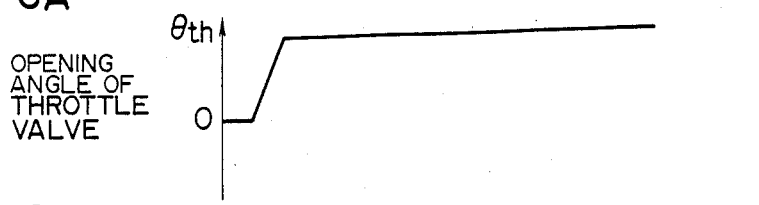
OPENING ANGLE OF THROTTLE VALVE
FIG. 6B
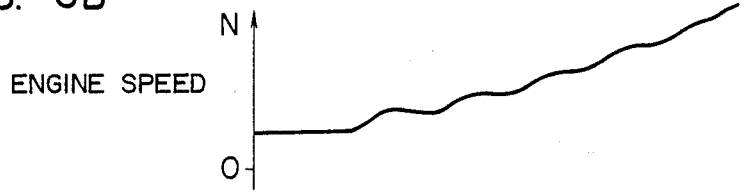
ENGINE SPEED
FIG. 6C
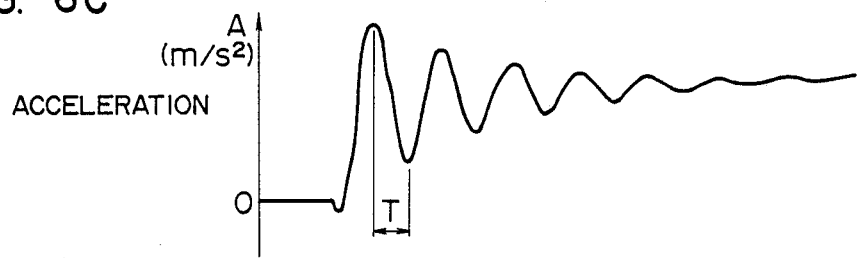
ACCELERATION
FIG. 6D
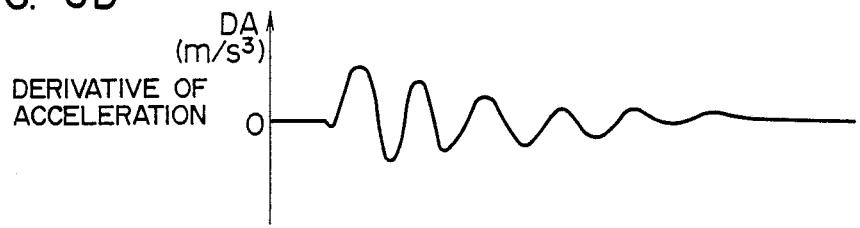
DERIVATIVE OF ACCELERATION
FIG. 6E
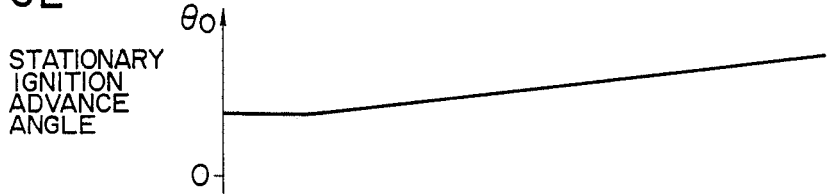
STATIONARY IGNITION ADVANCE ANGLE
FIG. 6F
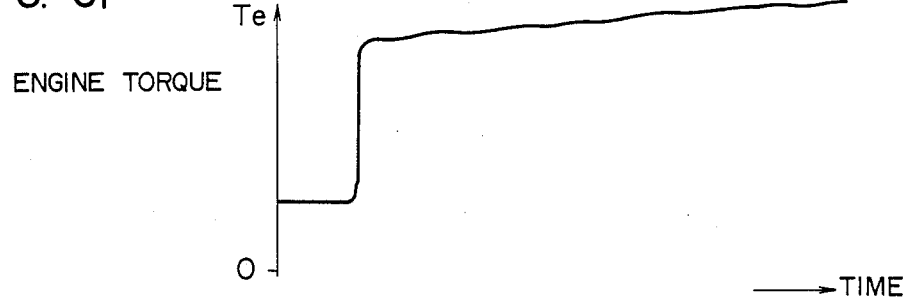
ENGINE TORQUE
→ TIME k=+(2)

→ TIME $k = +(8)$

→TIME

APPARATUS AND METHOD OF ELECTRONICALLY CONTROLLING ENGINE

BACKGROUND OF THE INVENTION

The present invention relates to an apparatus and method for electronically controlling an engine, and in particular to an apparatus and method for electronically controlling an engine so as to prevent longitudinal oscillation of the vehicle at the time of acceleration and deceleration.

The state of a vehicle changes depending upon whether the automobile is driven at a constant speed, accelerated or decelerated. If the engine is always controlled in the same way, therefore, oscillation in the longitudinal directions i.e., running directions of the vehicle or the like is caused, and hence the driver and the passenger feel uncomfortable. In order to prevent such longitudinal oscillation and make driving comfortable, electronic engine control apparatuses for performing engine control electronically have heretofore been used.

In an example of the method of preventing the longitudinal oscillation by using this electronic engine control apparatus is described in JP-A-No. 59-231144 and JP-A-No. 60-30446, correction is performed by fuel injection at the time of deceleration. In another prevention method as described in JP-A-No. 59-93945, correction is performed by means of the ignition advance angle and the amount of fuel supply so that the torque fluctuation may become minimum when the automobile runs at an extremely low speed.

As for the method of preventing the longitudinal oscillation of a vehicle in the above described prior art, correction was performed by means of the ignition advance angle, fuel injection and the like only at the time of deceleration and at the time of extremely low speed running. Assuming now that the driving state of a vehicle is divided into three modes, i.e., acceleration mode, constant speed running mode and deceleration mode, effective correction for preventing the longitudinal oscillation of a vehicle was not performed in the acceleration mode in the prior art. Because a method of detecting the longitudinal oscillation at the time of acceleration was not generally introduced. That is to say, there was no means for detecting whether movement of a vehicle whereby the driver felt uncomfortable was being cased or not in all of the acceleration, constant speed running and deceleration modes. Further, movement of acceleration affecting the driver's comfort was not considered. There were no systems having indexes, which could be selected by each driver, interposed in control.

SUMMARY OF THE INVENTION

A first object of the present invention is to provide a method, and apparatus, for electronically controlling an engine wherein the above described drawbacks of the prior art apparatuses are eliminated and the longitudinal oscillation of a vehicle is detected in acceleration and deceleration to prevent the longitudinal oscillation of the vehicle.

A second object of the present invention is to provide a method, and apparatus, for electronically controlling an engine in which an arbitrary vehicular longitudinal oscillation pattern can be selected in acceleration and deceleration.

In order to achieve the first object, in accordance with the present invention, the acceleration of the vehicle in the longitudinal directions is detected and its differential value or displacement difference, i.e., its acceleration derivative is derived, whereby the longitudinal oscillation state of the vehicle in acceleration and deceleration is detected and the output torque pattern of the engine is so controlled as to be opposite in phase to the pattern of the derivative of the acceleration thus derived.

For controlling the output torque pattern of an engine in accordance with the present invention, the ignition timing advance angle is preferably controlled on the basis of the derivative of acceleration.

By doing so, the longitudinal oscillation of the vehicle in acceleration and deceleration can be effectively prevented.

In accordance with an aspect of the present invention, the acceleration of the vehicle in the longitudinal directions measured by an acceleration sensor disposed on a vehicle is always taken into an engine control unit of an engine control apparatus, and the derivative of acceleration is calculated thereupon. By paying attention to the derivative of acceleration, longitudinal oscillation of the vehicle can be simply detected even in acceleration or deceleration of the vehicle. In the engine control unit, the engine output torque is corrected on the basis of the derivative of acceleration thus detected. By doing so, longitudinal oscillation and also pitching oscillation of the vehicle can be prevented even in acceleration and deceleration.

Further, instead of providing an acceleration sensor, it is possible to differentiate the engine speed, calculate the vehicular longitudinal acceleration, further differentiate the vehicular longitudinal acceleration to calculate the derivative of acceleration, and modify the engine output torque on the basis of derivative of acceleration thus calculated.

In order to achieve the second object, the present invention is so configured that an arbitrary output torque pattern of an engine may be selected in acceleration and deceleration.

That is to say, in accordance with an aspect of the present invention, a control parameter can be changed by using a potentiometer or a switch which can be manipulated from the driver's seat, and this change functions to change the magnitude of the engine output torque even if the acceleration measured by the acceleration sensor is not changed. By changing the output torque of the engine, it is possible to change the acceleration/deceleration pattern of the vehicle and hence the longitudinal oscillation pattern of the vehicle.

BRIEF DESCRIPTION OF THE DRAWINGS

FIG. 3 is a block diagram showing the function of the engine control apparatus according to the present invention;

FIG. 4 is a configuration diagram of a potentiometer for varying the acceleration pattern;

FIGS. 6A to 6F are diagrams showing various data obtained in acceleration in case ignition advance angle correction is not performed;

DESCRIPTION OF THE PREFERRED EMBODIMENTS

Embodiments of a method, and apparatus, for electronically controlling an engine according to the present invention will now be described in detail by referring to accompanying drawings.

Figure 1:
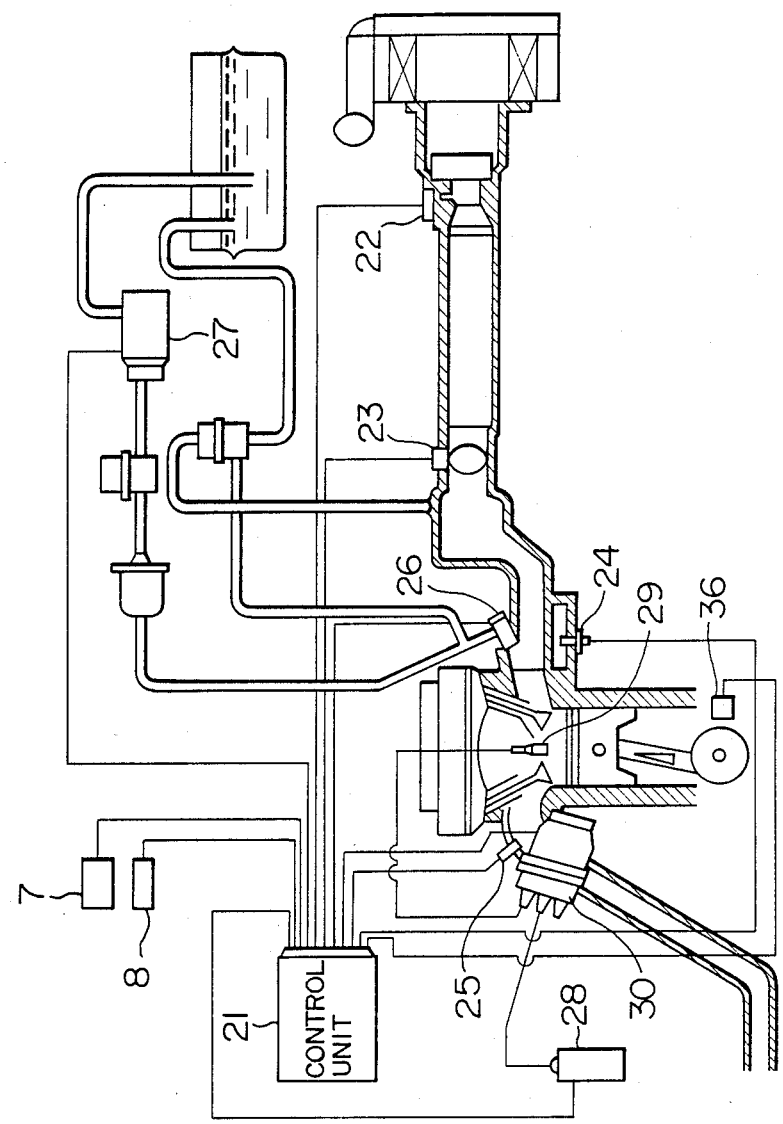
FIG. 1 is a schematic configuration diagram of an electronic engine control apparatus whereto the present invention has been applied.

FIG. 1 is a schematic configuration diagram whereto the present invention has been applied. An example of an engine control system using a digital control unit is shown.

In FIG. 1, numeral 21 denotes a digital control unit (hereafter simply referred to as control unit) which receives signals supplied from various sensors and performs various calculations, acceleration sensor 9, ignition advance angle control and the like, 22 an airflow sensor for measuring the amount of air flowing into an intake manifold, 23 an idle switch for measuring the opening/closing state of a throttle valve, 24 a water temperature sensor for measuring the temperature of engine cooling water, 25 a λ sensor for measuring the concentration of oxygen contained in exhaust gas, 26 a fuel injector, 27 a fuel pump for supplying fuel, 28 an ignition coil, 29 an ignition plug, 30 a distributer, and 36 a crank angle sensor.

In an engine control system configured as heretofore described, signals supplied from the above described sensors 7, 22 to 25 and 36 are inputted to the control unit 21. As a result of predetermined calculation, signals are outputted to the injector 26 and the fuel pump 27. The ignition advance angle thus calculated is outputted to the ignition coil 28 as a signal and is used to light up fuel at the ignition plug 29.

Figure 2:
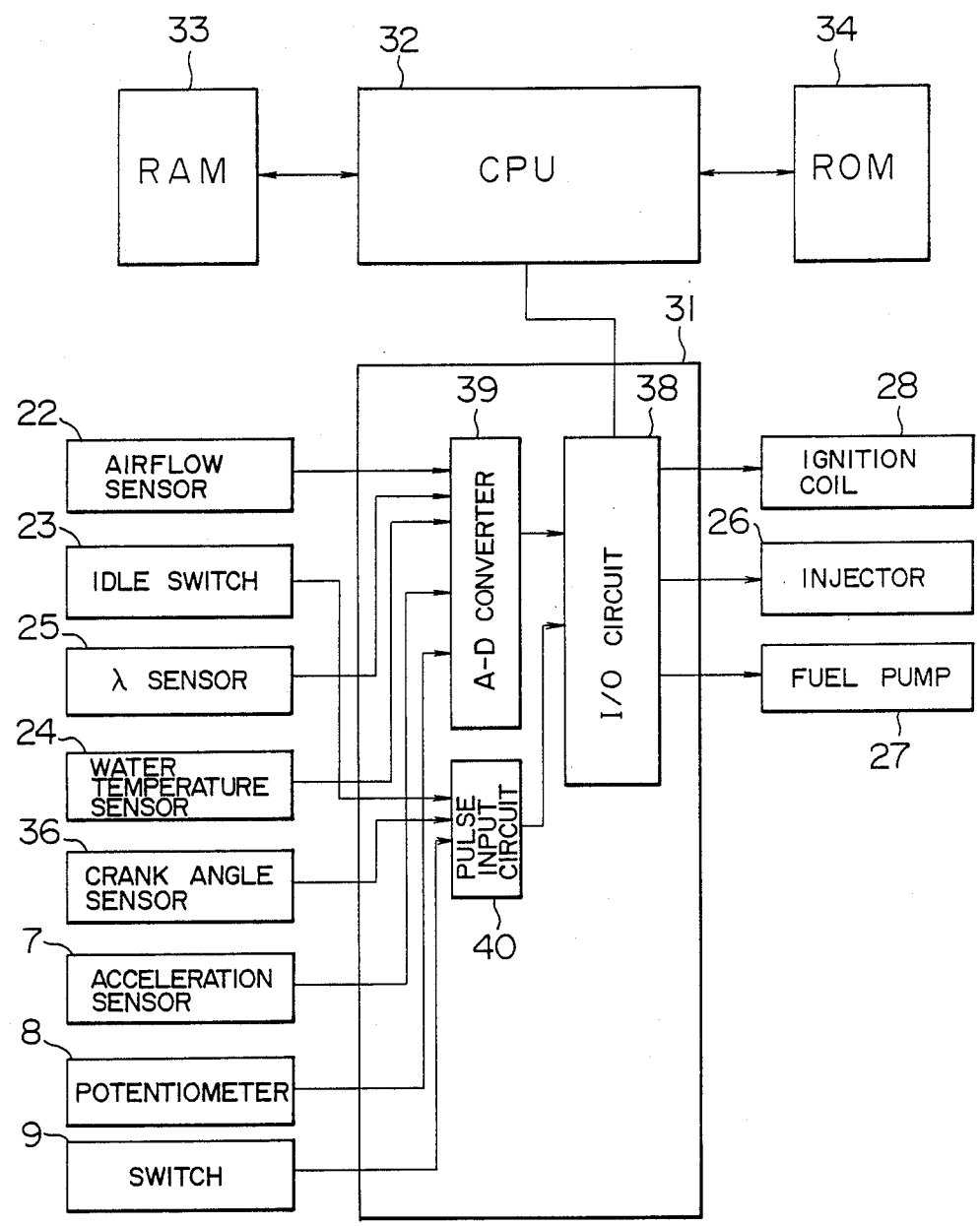
FIG. 2 is a configuration diagram of a control unit shown in FIG. 1.

FIG. 2 is a hardware configuration diagram of the control unit 21 shown in FIG. 1. The acceleration sensor 7, the potentiometer 8 for varying acceleration pattern, and the acceleration pattern selection switch 9 will be described later by referring to FIG. 3.

In FIG. 2, numeral 31 denotes an I/0 circuit unit for performing processing of input and output signals. The I/O circuit unit 31 includes an A-D converter 39 for applying A-D conversion to analog inputs supplied from sensors 22, 25, 24, 7 and 8, a pulse input circuit 40 for receiving digital inputs supplied from sensors 23, 9 and 36, and an I/O circuit 38 for supplying signals fed from the A-D converter 39 and the pulse input circuit 40 to a CPU (central processing unit) 32 and for supplying signals fed from the CPU 32 to various actuators 26 to 28.

The above described CPU performs predetermined calculation by using a random access memory (RAM) 33 and a read only memory (ROM) 34 storing program etc. and supplies output signals to respective actuators.

The configuration and operation of a control scheme which is used in the control unit heretofore described and which features the present invention will now be described.

In the embodiment described below, the case where the ignition timing is controlled to control the output torque of the engine in accordance with the detected derivative of acceleration will be described.

FIG. 3 is a function block diagram of a control apparatus adapted to control ignition timing on the basis of detected acceleration.

In FIG. 3, ignition timing advance angle is controlled by a control unit 1 comprising a stationary ignition advance angle calculation section 2, a differentiator 3 and a correction ignition advance angle calculation section 4.

The stationary ignition advance angle calculation section 2 receives engine speed N and basic injection quantity Tp and calculates ignition advance angle $\theta_0$ in the stationary state (i.e., in the state other than the acceleration state and the deceleration state) by using a two-dimensional map stored in the ROM 34. That is to say, the stationary ignition advance angle $\theta_0$ is calculated by the relation $$\theta_0 = f(Tp, N) \qquad (1)$$

where the engine speed N is derived in the CPU 32 on the basis of pulses outputted from the crank angle sensor 36 whenever the crank shaft rotates by a predetermined angle. The basic injection quantity Tp is calculated by the CPU in accordance with a known method on the basis of output signals from the airflow sensor 22, the $O^2$ sensor (λ sensor) 25, the water temperature sensor 24 etc.

The differentiator 3 differentiates acceleration A taken in via an acceleration sensor 7 to perform calculation of dA/dt and calculate derivative DA of acceleration.

The acceleration sensor 7 is preferably a semiconductor strain gauge sensor preferably attached to a chassis 6 mounting the engine 5 so as to detect the acceleration of the vehicle in the longitudinal direction.

The correction ignition advance angle calculation section 4 multiplies the derivative DA (m/sec$^3$) of acceleration with a coefficient k (degree/(m/sec$^3$)) to obtain correction ignition advance angle $\theta_1$. That is to say, the correction ignition advance angle $\theta_1$ is calculated by the relation $$\theta_1 = k \cdot (dA/dt) = k \cdot DA \qquad (2)$$

where the coefficient k is defined by the value of the potentiometer 8 or the output of the switch 9 which can be adjusted by the driver.

FIG. 4 is a configuration diagram of an example of the potentiometer 8 for adjusting the acceleration pattern (output torque pattern). A variable resistor is connected in series with direct current power supply, and the output voltage of its slider is supplied to the I/O circuit unit 31. The value of k is defined in accordance with the output voltage.

The switch 9 is preferably a known switch which can be changed over among three states. Depending upon the changeover state, the digital signal 00, 01 or 10 is outputted. The value of k is changed in response to the digital signal.

The correction ignition advance angle $\theta_1$ derived as described above is subtracted from the stationary ignition advance angle $\theta_0$ to derive ignition advance angle $\theta$ as represented by equation (3) below. The signal representing $\theta$ is sent to the ignition coil.

$$\theta = \theta_0 - \theta_1 \qquad (3)$$

Therefore, ignition is performed by the ignition coil 28 at timing of the ignition advance angle $\theta$. That is to say, the engine is driven at a torque which is obtained by correcting the torque obtained at the stationary ignition advance angle $\theta_0$ with an amount corresponding to the correction ignition advance angle $\theta_1$.

Figure 5:
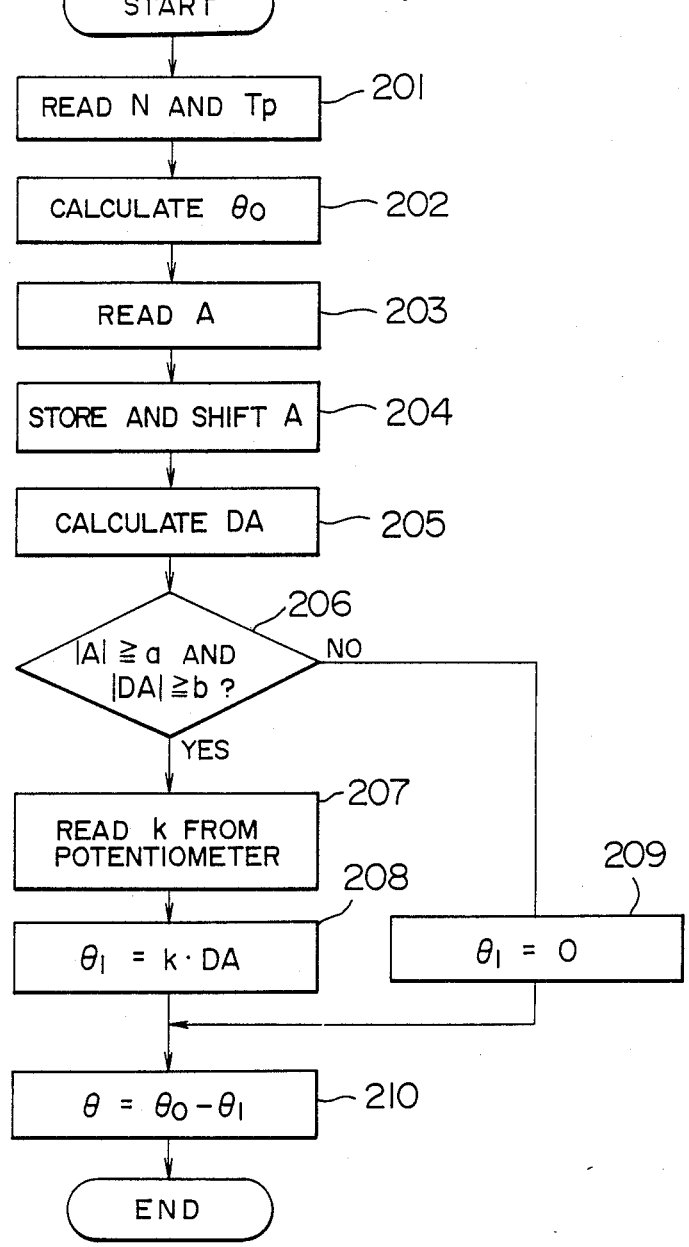
FIG. 5 is a flowchart used for explaining the operation in an embodiment of the present invention.

The operation performed when the present invention is applied to the configuration heretofore described is shown in FIG. 5 by using a flowchart.

First of all, the engine speed N and the injection pulse width Tp are read (step 201). On the basis of N and Tp thus read, the stationary ignition advance angle $\theta_0$ is calculated (step 202). Succeeding operation features the present invention.

The output value (acceleration) A of the acceleration sensor 7 is read (step 203). The output value thus read is stored into the RAM 33, and the value of acceleration A' read the last time, i.e., one calculation period before and stored into the RAM is shifted (step 204).

The derivative DA of acceleration is then calculated (step 205). The derivative DA of acceleration is calculated by the relation indicated below. The step 205 corresponds to the block 3 of FIG. 3.

$$DA = (A - A')/\Delta T \qquad (4)$$

where
A: current A (acceleration)
A': previous A (acceleration) obtained one calculation period before
$\Delta T$: calculation period.
Here, A' is not limited to A (acceleration) obtained one calculation period before. If A' is acceleration obtained n calculation periods before, it follows that $\Delta T = n*\Delta T$.

It is then judged whether the vehicle is in the longitudinal oscillation state or not (step 206). It is herein regarded that the vehicle is in the longitudinal oscillation state when absolute values of the derivative DA of acceleration and the acceleration are not less than certain values.

That is to say, it is regarded that the vehicle is in the longitudinal oscillation state when $|A| \geq a$ and $|DA| \geq b$, where a and b are their respective predetermined values.

If $|A| < a$ or $|DA| < b$, it is judged that the vehicle is not in the longitudinal oscillation state, and the correction ignition advance angle $\theta_1$ is set at 0 degree at step 209. It is thus possible to make the correction ignition advance angle equal to zero degree unless otherwise needed. If it is judged that the vehicle is in the longitudinal oscillation state, the coefficient k is read preferably from a map included in the ROM on the basis of the value of the potentiometer 8 set arbitrarily by the driver or on the basis of the selected state of the switch 9 (step 207).

That is to say, it is assumed that the value of k corresponding to the output voltage of the potentiometer 8 or the output value of the switch 9 is stored beforehand in the ROM as a two-dimensional map.

In case the value of k is controlled by the potentiometer 8, for example, therefore, the value of k may be continuously changed from 0 to a maximum value, say, 8 in accordance with the output voltage value of the potentiometer 8.

On the other hand, in case the value of k is controlled by the output state of the switch 9, the value of k may be set at 2, 4 and 8, for example, respectively for the output signal 00, 01 and 10 of the switch 9, for example.

Succeedingly from the derivative DA of acceleration derived at step 205 and the coefficient k derived at step 207, the correction ignition advance angle $\theta_1$ is calculated (step 208).

The correction ignition advance angle $\theta_1$ thus calculated is subtracted from the stationary ignition advance angle $\theta_0$ to obtain the ignition advance angle $\theta$ (step 210). The operation of an embodiment according to the present invention has heretofore been described.

In the above described embodiment, acceleration A is derived from the output of the acceleration sensor 7. However, acceleration A may be derived from the change rate of the engine speed. That is to say, acceleration A may be derived by the relation $A = (N - N')/\Delta T$ on the basis of the value N of the engine speed obtained at the step 201 and engine speed N' obtained one calculation period before.

Further, in the above described embodiment, the stationary ignition advance angle $\theta_0$ is derived from the engine speed N and the basic injection quantity. However, the stationary ignition advance angle may be derived from the engine speed N and the negative pressure of an intake manifold.

Effects of the above described embodiment will now be described by referring to FIGS. 6A to 6F, 7A to 7G, 8A to 8E, and 9A to 9D.

FIGS. 6A to 6F are time charts showing various data in acceleration in case the ignition advance angle is not corrected (i.e., k=0). If the throttle valve is abruptly opened (FIG. 6A), the engine speed N increases windingly and gradually (FIG. 6B), and the ignition advance angle $\theta_0$ also increases slowly (FIG. 6E). The engine torque Te also abruptly increases and becomes nearly constant (FIG. 6F). Therefore, the acceleration A oscillates at low frequencies repeatedly and is gradually damped (FIG. 6C). The period T of acceleration oscillation is typically close to 0.25 sec.

The derivative DA of acceleration is obtained by differentiating the acceleration A. The oscillation of the derivative DA of acceleration has the same period as that of acceleration and is 90 degrees in advance of acceleration in phase (FIG. 6D).

The derivative DA of acceleration thus oscillates largely and oscillates for approximately 4 periods until convergence. The vehicle continues to oscillate largely in the longitudinal directions during that time.

Figure 7A:
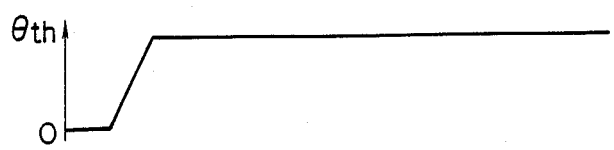
FIGS. 7A to 7G, 8A to 8E and 9A to 9D are diagrams showing various data obtained in acceleration in case ignition advance angle correction is performed.
Figure 7B:
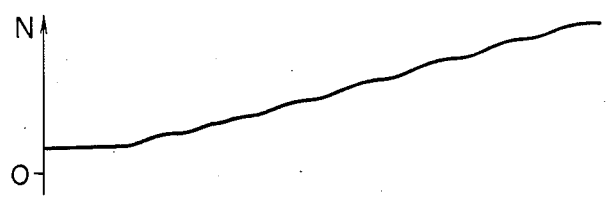
Figure 7C:
Figure 7D:
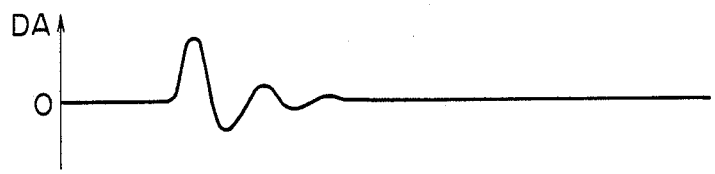
Figure 7E:
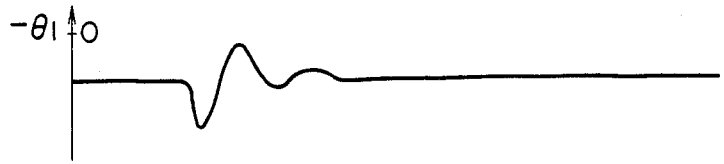
Figure 7F:
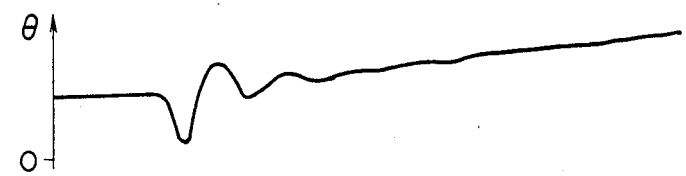
Figure 7G:
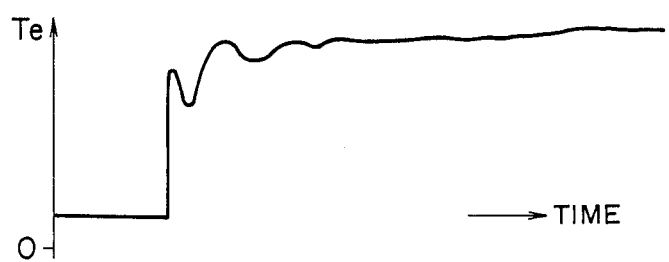

FIGS. 7A to 7G are time charts showing various data obtained when the ignition advance angle correction is performed. FIGS. 7A to 7G are data diagrams obtained when the value is made small, say, 2. As evident from FIG. 7E, the correction ignition advance angle $\theta_1$ has nearly the same phase and the same pattern as those of the derivative DA of acceleration. Therefore, the ignition advance angle $\theta$ after correction has a pattern as shown in FIG. 7F. As shown in FIG. 7G, the output torque Te of the engine abruptly increases when the accelerator pedal is depressed and then decreases slightly to form nearly the same phase and the same pattern as those of the ignition advance angle $\theta$.

As shown in FIG. 7B, therefore, winding of the engine speed in acceleration is decreased. Accordingly, the derivative DA of acceleration, i.e., the longitudinal oscillation of the vehicle decreases in amplitude and rapidly converges. That is to say, in the example of FIG. 7D, the derivative of acceleration converges after oscillation of approximately two periods and hence in approximately 0.5 sec.

Figure 8A:
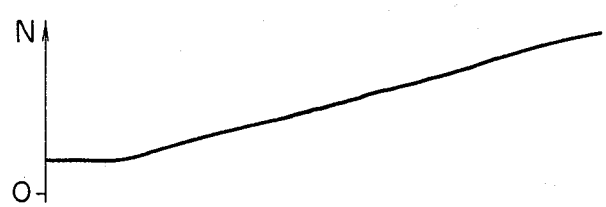
Figure 8B:
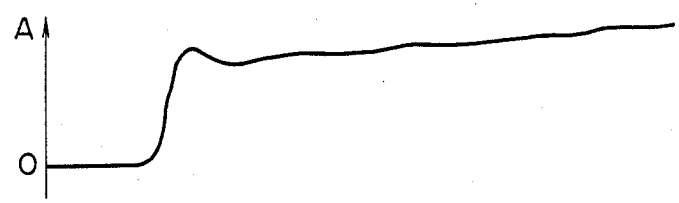
Figure 8C:
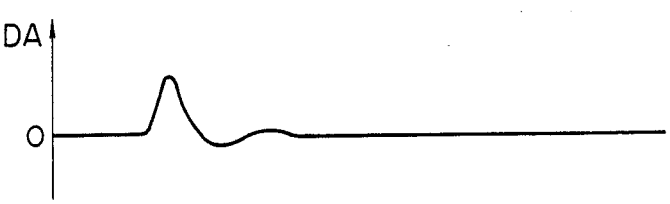
Figure 8D:
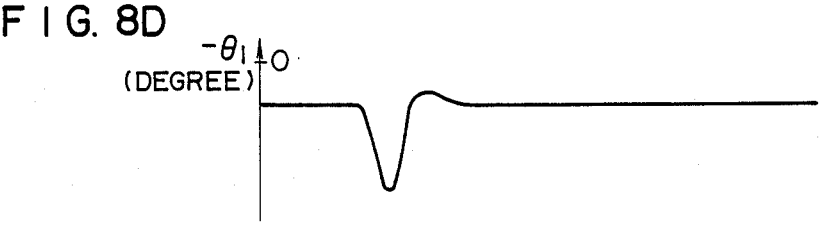
Figure 8E:
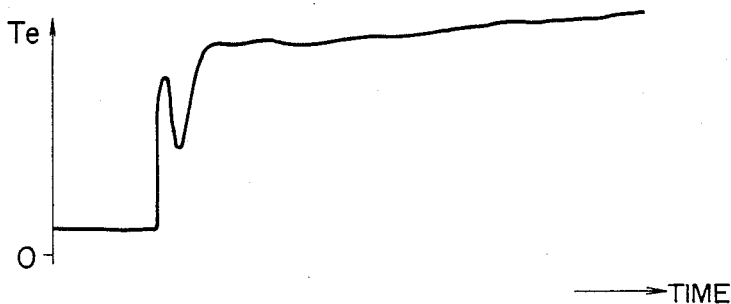

FIGS. 8A to 8E are time charts showing various data obtained when the value of k is defined to be a middle value, say, 4. In this case, winding of the engine speed N nearly disappears (FIG. 8A), and oscillation of the acceleration A and the derivative DA of acceleration further decreases (FIGS. 8B and 8C). The longitudinal oscillation of the vehicle converges in approximately one period (i.e., approximately 0.25 sec.).

Figure 9A:
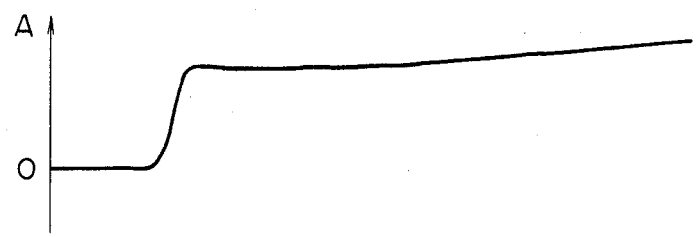
Figure 9B:
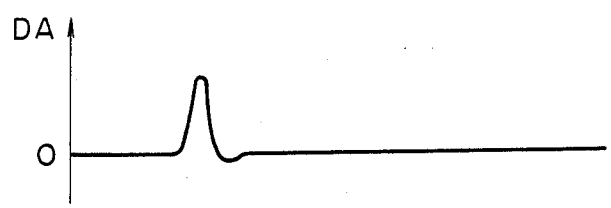
Figure 9C:
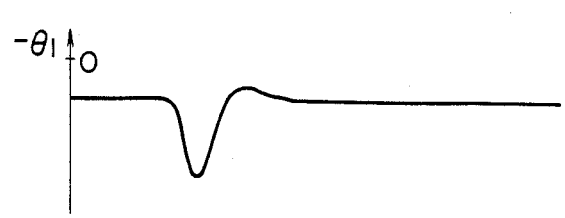
Figure 9D:
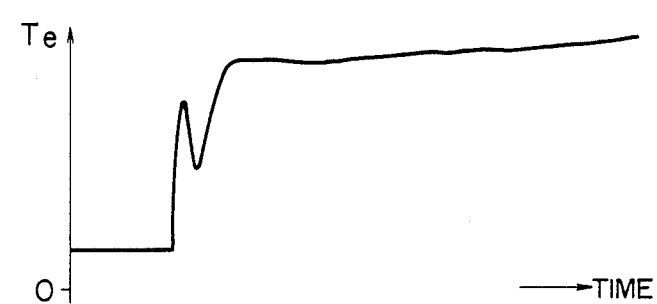
Figure 10:
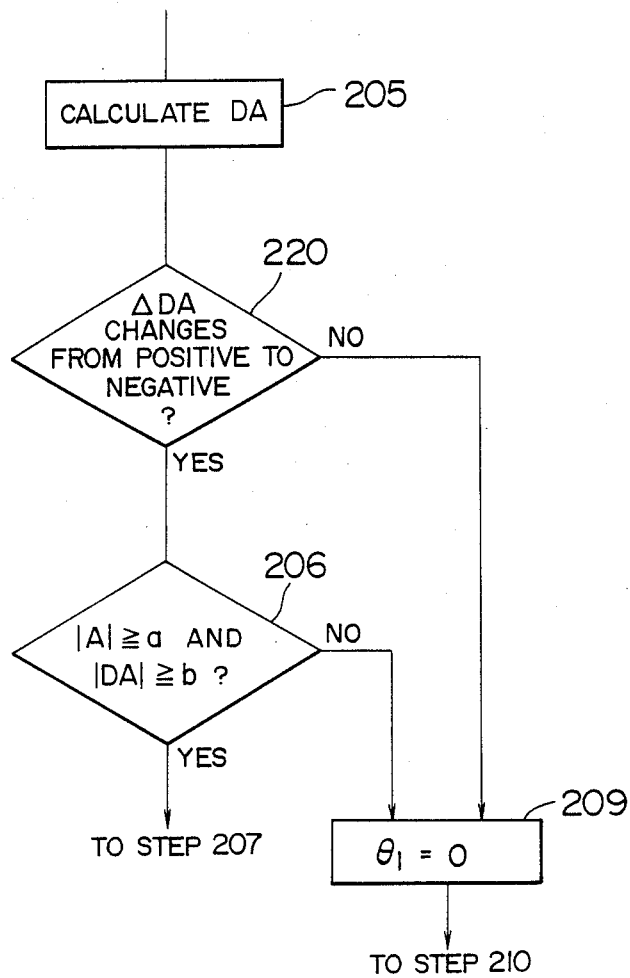
FIG. 10 is a flowchart used for explaining the operation of a second embodiment of the present invention.

FIGS. 9A to 9D are time charts of various data obtained when the value of k is defined to be the maximum value, say, 8. In this case, winding of the engine speed N disappears, and oscillation of the acceleration A and the derivative DA of acceleration is not seen (FIGS. 9A and 9B).

The operation in acceleration has heretofore been described. In deceleration as well, the correction ignition advance angle $\theta_1$ is similarly defined on the basis of the value of k and the derivative DA of acceleration, and the stationary ignition advance angle is corrected. Convergence of longitudinal oscillation of the vehicle is effectively performed.

Especially in the above described embodiment, the ignition advance angle is controlled on the basis of the derivative of acceleration in order to control the engine torque on the basis of the derivative of acceleration. Therefore, the torque control can be achieved rapidly and by using a simple configuration, because control of ignition advance angle has the best response as a method for torque control.

Instead of the ignition advance angle control, an electronic throttle valve may be so used that opening $\theta$th of the throttle valve may be controlled on the basis of the derivative of acceleration. Or the injection quantity may be controlled on the basis of the derivative of acceleration. Further, the throttle opening and/or the injection quantity may be controlled together with the ignition advance angle control.

A feature of the present invention is that the acceleration pattern, i.e., the pattern of the longitudinal oscillation of the vehicle can be changed by the driver via a potentiometer or a switch located near at hand. From respective patterns of acceleration A shown in FIGS. 7C, 8B and 9A, it is understood that variation of the value of the coefficient k performed by the driver has an effect on changing the acceleration pattern and hence the longitudinal oscillation pattern.

In the present embodiment, an acceleration sensor is thus provided, and ignition advance angle control is performed by paying attention to the derivative of acceleration calculated from acceleration. Thereby, longitudinal oscillation and also pitching oscillation of the vehicle can be detected and prevented in all of the acceleration, constant speed running and deceleration modes. Since the quantity of the correction ignition advance angle, which is a manipulated variable, can be changed by using a potentiometer or a switch which can be adjusted by the driver, it is possible to make an acceleration pattern, i.e., a longitudinal oscillation pattern meeting the driver's intention.

A second embodiment of the present invention will now be described by referring to a flowchart of FIG. 10 and FIGS. 11A to 11D. In this embodiment, longitudinal oscillation of the vehicle in acceleration is converged when predetermined time has elapsed since the start of oscillation in accordance with the driver's choice.

Figure 11A:
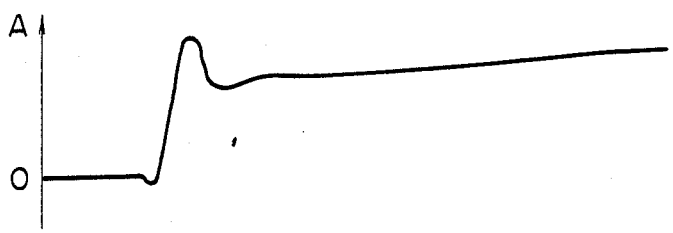
FIGS. 11A to 11D are diagrams showing various data obtained in acceleration in case ignition advance angle correction is performed in the second embodiment.
Figure 11B:
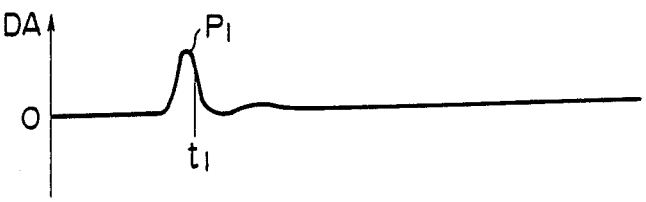
Figure 11C:
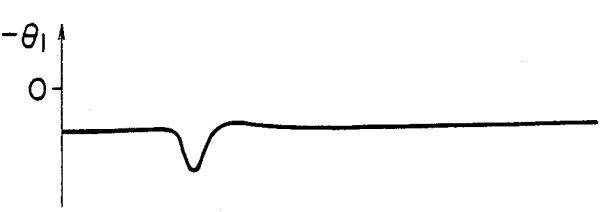
Figure 11D:
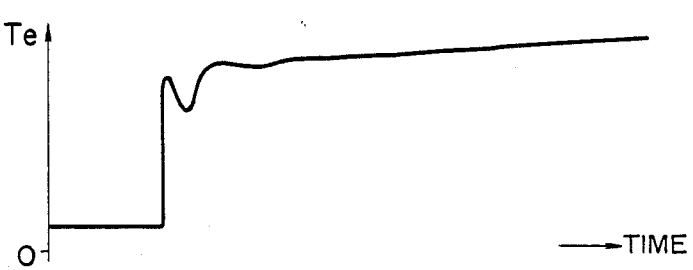

In a pattern of derivative of acceleration in acceleration as shown in FIG. 11B, the derivative DA of acceleration increases and passes through a first peak $P_1$. At time $t_1$ immediately succeeding the first peak $P_1$, i.e., at time $t_1$ when a deviation $\Delta DA$ of DA ($\Delta DA = DA - DA'$, where DA is a current value and DA' is a previous value obtained one calculation period before) has changed from positive to negative, the stationary ignition advance angle is corrected to damp the oscillation in the embodiment represented by the flowchart of FIG. 10. For this purpose, step 220 is inserted between steps 205 and 206 shown in the flowchart of FIG. 5. In step 220, a value $\Delta DA$ is calculated and it is checked whether a value $\Delta DA$ is changed from positive to negative or not. Until $\Delta DA$ changes from positive to negative, $\theta_1$ is set at 0 at step 209. If $\Delta DA$ changes from positive to negative, step 206 and succeeding steps are executed to calculate the correction ignition advance angle $\theta_1$ and correct the stationary ignition advance angle, the oscillation being converged. It is thus possible to provide a driver with longitudinal oscillation in acceleration only once to give feeling of acceleration to the driver.

In an alternatively preferred embodiment, therefore, the driver selects such time lag of ignition advance angle correction in acceleration via a switch (not illustrated), and the state of this switch is checked before the step 220 to determine whether the step 220 should be executed.

Figure 12A:
FIGS. 12A and 12B are diagrams showing various data in a variant of the second embodiment.
Figure 12B:
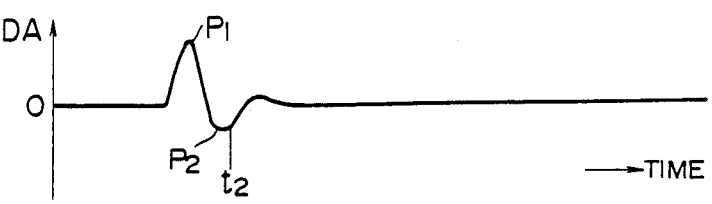

A variant of the second embodiment will now be described by referring to FIGS. 12A and 12B. In this variant, the stationary ignition advance angle is corrected at time $t_2$ immediately succeeding a second peak $P_2$ of the derivative of acceleration caused after acceleration. After longitudinal oscillation lasting approximately one period has been caused in acceleration, therefore, oscillation is rapidly converged.

As heretofore described, the present invention makes it possible to prevent longitudinal oscillation of a vehicle in all of acceleration, constant speed running, and deceleration modes by detecting the oscillation and correcting the output torque of the engine. Further, the longitudinal oscillation pattern in acceleration can be changed in accordance with driver's choice, resulting in improved response to acceleration and riding comfort.

I claim:

1. An electronic engine control apparatus comprising:
   a plurality of sensors for detecting operating conditions of an engine which drives a vehicle;
   a plurality of actuators for controlling the engine;
   control means for calculating manipulated variables of said actuators on the basis of outputs of said sensors and for supplying the manipulated variables to said actuators to control the output torque of the engine;
   means for measuring acceleration in the travelling directions of the vehicle;
   differentiation means for calculating displacement difference per unit time of said measured acceleration to thereby detect differentiated acceleration as the longitudinal oscillation of the vehicle in the travelling direction; and correction means responsive to said differentiation means for calculating a correction value, from the differentiated acceleration, of at least one of the manipulated variables of said actuators to correct the magnitude of the output torque of the engine so as to cause its phase to be opposite to the phase of magnitude of said displacement difference of acceleration and for supplying the calculated correction value to said control means to correct the at least one of said manipulated variables.

2. An electronic engine control apparatus according to claim 1, wherein said at least one of said actuators comprises an ignition coil, and the at least one of said manipulated variables of the actuators comprises an ignition advance angle of said ignition coil.

3. An electronic engine control apparatus according to claim 2, wherein said means for measuring acceleration calculates displacement difference per unit time of engine speed to obtain the acceleration in travelling directions of the vehicle.

4. An electronic engine control apparatus according to claim 1, further comprising correction value modifying means for modifying the correction value of said at least one manipulated variable calculated by said correction means.

5. An electronic engine control apparatus according to claim 4, wherein said correction value modifying means modifies said correction value at a predetermined delay time after detection of a longitudinal oscillation state of the vehicle.

6. An electronic engine control apparatus according to claim 2, wherein said correction means derives a product of said calculated displacement difference and a coefficient as the correction value of the ignition advance angle, and corrects the manipulated variable of ignition advance angle calculated in said control means by using said correction value.

7. An electronic engine control apparatus according to claim 6, further comprising means capable of arbitrarily setting said coefficient value.

8. A method for electronically controlling an internal combustion engine including a plurality of sensors for detecting operating conditions of the engine for driving a vehicle and a plurality of actuators for controlling the engine, comprising:

calculating manipulated variables of said actuators on the basis of the output of said sensors to control the output torque of the engine;

measuring acceleration of the vehicle in the travelling directions;

differentiating acceleration by calculating displacement difference per unit time of said measured acceleration to thereby detect differentiated acceleration as the longitudinal oscillation state of the vehicle in the travelling direction;

calculating, from the differentiated acceleration, a correction value of at least one of the manipulated variables of said actuators to correct the magnitude of the output torque of the engine so as to cause its phase to be opposite to the phase of magnitude of said detected displacement difference of acceleration; and correcting the at least one of said manipulated variables of said actuators by using said correction value and supplying the result to at least one of said actuators.

9. The method according to claim 8, wherein said at least one of said actuators comprises an ignition coil, and the at least one of said manipulated variables of the actuators comprises an ignition advance angle of said ignition coil.

10. The method according to claim 8, wherein said step of measuring acceleration comprises the step of calculating displacement difference per unit time of engine speed to obtain the acceleration in the travelling directions of the vehicle.

11. The method according to claim 8, wherein said step of correcting comprises the step of modifying the correction value of said manipulated variable calculated by said step of calculating and correcting the at least one of said manipulated variables of said actuators by using said modified correction value.

12. The method according to claim 11, wherein said step of correcting is performed at predetermined delay time after detection of the longitudinal oscillation state of the vehicle.

13. The method according to claim 9, wherein said step of calculating comprises the step of deriving the product of the calculated displacement difference and a coefficient arbitrarily set as the correction value of the ignition advance angle.

14. An electronic engine control apparatus according to claim 1, wherein said at least one of said actuators comprises a throttle valve, and the at least one of said manipulated variables of the actuators comprises a throttle valve opening of said throttle valve.

15. An electronic engine control apparatus according to claim 1, wherein said at least one of said actuators comprises injection quantity control means, and the at least one of said manipulated variables of the actuators comprises the injection quantity of said injection quantity control means.

16. An electronic engine control apparatus according to claim 4, wherein said means for modifying includes a manual control accessible to the driver.

17. An electronic engine control apparatus according to claim 5, wherein said means for modifying includes a manual control accessible to the driver.

18. The method according to claim 8, wherein said at least one of said actuators comprises a throttle valve, and the at least one of said manipulated variables of the actuators comprises an opening of said throttle valve.

19. The method according to claim 8, wherein said at least one of said actuators comprises fuel injection quantity control means, and the at least one of said manipulated variables of the actuators comprises a fuel quantity of said fuel quantity injection control means.

20. The method according to claim 11, wherein said modifying is accomplished by the driver manipulating a manual control.

21. The method according to claim 12, wherein said modifying is accomplished by the driver manipulating a manual control.

* * * * *